United States Patent
Beaufils et al.

(10) Patent No.: US 7,422,990 B2
(45) Date of Patent: Sep. 9, 2008

(54) THERMAL/ACOUSTIC INSULATION PRODUCT BASED ON MINERAL WOOL

(75) Inventors: Sébastien Beaufils, Cernoy (FR); Claire Calero, Erquery (FR); Kathleen Coventry-Saylor, Exton, PA (US)

(73) Assignee: Saint-Gobain Isover, Courbevoie (FR)

( * ) Notice: Subject to any disclaimer, the term of this patent is extended or adjusted under 35 U.S.C. 154(b) by 607 days.

(21) Appl. No.: 10/312,554

(22) PCT Filed: Jul. 12, 2001

(86) PCT No.: PCT/FR01/02285

§ 371 (c)(1),
(2), (4) Date: Jul. 21, 2003

(87) PCT Pub. No.: WO02/06177

PCT Pub. Date: Jan. 24, 2002

(65) Prior Publication Data

US 2004/0101682 A1  May 27, 2004

(30) Foreign Application Priority Data

Jul. 13, 2000  (FR) .................................. 00 09267

(51) Int. Cl.
*B32B 5/26* (2006.01)
(52) U.S. Cl. .................. 442/319; 442/102; 442/120; 442/172; 442/180; 442/364; 442/378; 428/212; 428/213; 428/214; 428/215; 428/216; 428/217; 428/218; 428/364; 428/365; 428/377; 178/18.05; 174/68.1; 174/124 R; 73/862.046

(58) Field of Classification Search .................. 442/102, 442/172, 180, 364, 120, 378; 428/212, 213–218
See application file for complete search history.

(56) References Cited

U.S. PATENT DOCUMENTS

| | | | | |
|---|---|---|---|---|
| 2,206,059 | A | * | 7/1940 | Games ........................ 138/123 |
| 3,355,314 | A | * | 11/1967 | Gagnon et al. ................. 442/72 |
| 3,861,895 | A | * | 1/1975 | Tarazi .......................... 65/451 |
| 4,039,716 | A | | 8/1977 | Johnson |
| 4,536,447 | A | | 8/1985 | Hsu |
| 4,572,865 | A | * | 2/1986 | Gluck et al. .............. 428/309.9 |
| 4,613,627 | A | * | 9/1986 | Sherman et al. ................ 521/68 |
| 5,108,788 | A | * | 4/1992 | Williams ..................... 427/154 |
| 5,879,793 | A | * | 3/1999 | Kummermehr .......... 428/306.6 |
| 5,908,501 | A | * | 6/1999 | Pucillo ....................... 106/634 |
| 5,992,093 | A | * | 11/1999 | De Groot et al. ............... 47/64 |

FOREIGN PATENT DOCUMENTS

| | | | |
|---|---|---|---|
| EP | 144300 A2 | * | 6/1985 |
| WO | WO 8805096 A | * | 7/1988 |
| WO | 00 21900 | | 4/2000 |

* cited by examiner

*Primary Examiner*—Andrew T Piziali
*Assistant Examiner*—Peter Y Choi
(74) *Attorney, Agent, or Firm*—Oblon, Spivak, McClelland, Maier & Neustadt, P.C.

(57) ABSTRACT

A thermal and/or acoustic insulation product, and an apparatus and the process for manufacturing the product. The product is based on mineral wool of the glass wool or rock wool type. The product has at least part of its external surface uncovered. The product is surface-treated over at least a portion of the external surface with a composition having softening properties and including at least one surfactant.

31 Claims, 3 Drawing Sheets

THERMAL/ACOUSTIC INSULATION PRODUCT BASED ON MINERAL WOOL

Figure 1:
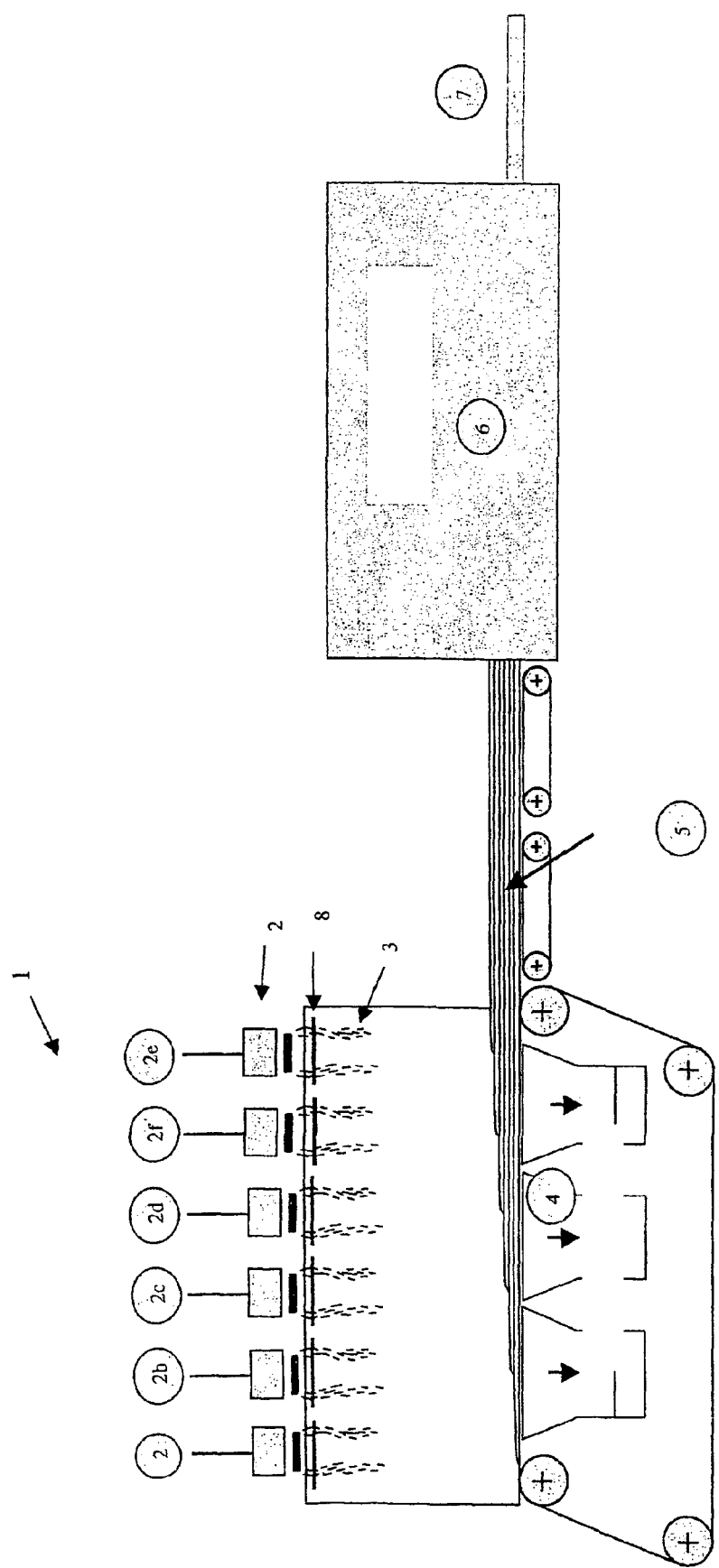

The present invention relates to thermal and/or acoustic insulation products based on mineral wool, especially based on glass wool. It also applies to rock wool or basalt wool.

It also relates to the method of obtaining them, especially using a process called centrifuging. This process consists, in a known manner, in introducing a stream of molten glass into a spinner, also called a fiberizing dish, rotating at high speed and pierced around its periphery by a very large number of holes through which the glass is thrown out in the form of filaments owing to the effect of the centrifugal force. These filaments are then subjected to the action of an annular high-velocity extending blast of hot gases hugging the wall of the spinner, which blast attenuates the filaments and converts them into fibres. The fibres formed are entrained by this extending blast of gas to a receiving device, generally consisting of a gas-permeable belt. For greater details about this process, reference may be made in particular to patents EP-0,189,354 and EP-0,519,797.

The invention relates more particularly, without however implying any limiting character, to so-called "light" insulation products, that is to say those generally having a density of at most 40 kg/m³. It also applies to products of higher density, particularly between 40 and 160 kg/m³. The invention is aimed at insulation products of this type, at least part of the external surface of which is bare, i.e. not covered with a facing of the metal film/plastic film/paper sheet type or a multilayer facing.

These products, which are usually in the form of panels of rectangular cross section and of various dimensions, are widely used to insulate buildings, both old and new, or to insulate pipes. They are likely to be handled a great deal when being laid on site. The user frequently has to exert pressure on their surface, for example in order to forcibly lodge them between the rafters of a roof. This is also the case for the insulation of pipes or of timber framework for walls or ceilings, or for the insulation of metal structures, for example for industrial buildings (the latter type of insulated architecture usually being called in the USA Metal Building Insulation or MBI). Repeatedly touching the surface of these mineral-wool products, when it has no facing, may become somewhat unpleasant for the user.

The objective of the invention is therefore to avoid this drawback by seeking to make it more pleasant to lay these products and to make them more agreeable to touch.

Secondarily, the invention seeks to achieve this objective without the other properties of these products being substantially affected, especially their thermal insulation properties and their mechanical properties.

Secondarily, the invention seeks to achieve this objective while taking account of the requirements of industrial production, especially using means that are simple to employ and flexible to use.

The subject of the invention is firstly a thermal and/or acoustic insulation product based on mineral wool of the glass wool type, at least part of the external surface of which product is uncovered, and the product is surface-treated over at least a portion of this surface with a composition having softening properties and comprising at least one surfactant.

The invention has thus found a simple, economical and effective method of improving the feel of mineral-wool products. Surprisingly, it was shown that the presence of a surfactant on the surface of the product, even in a small amount and to a very shallow depth, had a considerable impact on the perception of its feel, being much softer, as if the surface of the product were smoothed. Surfactants have already been used in many fields, especially for providing fabrics in the textile industry with a sizing or finish. However, it was not possible to predict that they would have such an effect on a product in which the individual fibres are not organized in the form of a woven fabric or on a "thick" product. The reasons why this effect is obtained have not been entirely elucidated: the assumption is that there is perhaps a phenomenon of surfactant adsorption on the surface of the fibres, and that the mutual rubbing of the fibres would be decreased by this "sheathing", and contact with the fibres thereby perceived as being softened.

Treating only the surface of the products according to the invention has three considerable advantages:

firstly, it was shown that the presence of surfactant throughout the thickness of the material was unnecessary to obtain the sought after effect;

secondly, it is simpler and less expensive to treat only part of the product, for example at the end of a line, on each of its faces rather than having to treat it right to the core;

thirdly, it is thus possible to apply, to the surface of the product, a softening composition whose active principle—the surfactant—would be incompatible with uncrosslinked sizing composition.

Advantageously, the product is treated with the composition having softening properties only over a shallow depth, especially of at most 10 mm and preferably at most 5 mm, for example over 1 to 3 mm, for the reasons explained above.

The content of softening composition on the surface of the product thus treated is preferably at least 0.1 g/m² of treated surface, especially at most 5 g/m², for example between 0.2 g/m² and 1 g/m². A very moderate content is therefore sufficient to obtain the desired effect, which content does not therefore appreciably modify the appearance and the chemical nature of the products in question.

Advantageously, the composition having softening properties is used in the form of a liquid, a paste or a gel, preferably one miscible in aqueous phase, or in solid form (powder or flakes) and preferably soluble/dispersible in aqueous phase. As will be explained in detail below, the composition may thus be easily diluted, dissolved or dispersed in water in order to be sprayed onto the surface of the products to be treated.

According to a preferred embodiment, the softening composition comprises at least one surfactant of the family of cationic surfactants, the latter proving to be the most effective. In the context of the invention, the term "cationic surfactant" should be understood to mean not only a surfactant carrying a localized positive charge (a "true" cationic salt such as, for example, an amidoamine or imidazolinium salt) but also a surfactant carrying a delocalized charge (such as, for example, an amine oxide). Within this family, products having one or more chains based on fatty acids or on fatty acid derivatives and including one or more nitrogen-containing groups capable of carrying a localized or delocalized positive charge are especially preferred. These groups may be primary amines, secondary amines, tertiary amines, quaternary ammoniums or amine oxides. They seem particularly beneficial as they interact with the surface of the glass, which surface is rather ionized negatively. It is the nitrogen-containing groups which fix the molecule to the fibres. This chemical functionality would give the molecule the ability to be lastingly fixed to the fibre, while the fatty chains (hydrocarbons) would give it the desired softness.

The most beneficial surfactants are, for example, quaternary ammonium salts or imidazolinium salts having fatty chains (with an acetate-type counterion, for example) or amine oxides having fatty chains (for example, stearyl dimethylamine oxide), with a dative bond between the oxygen and the nitrogen.

The fatty chains (hydrocarbons) are fatty acid derivatives, which are of $CH_3(CH_2)_n COOH$ type when they are saturated. There are also unsaturated fatty acids. Examples of fatty acids whose derivatives can be used in the surfactant composition according to the invention are:

stearic acid $CH_3(CH_2)_{16}COOH$
lauric acid $CH_3(CH_2)_{10}COOOH$
palmitic acid $CH_3(CH_2)_{14}COOH$
myristic acid $CH_3(CH_2)_{12}COOH$ Mention may also be made of unsaturated fatty acids such as oleic or linoleic acid. The fatty acids are often limited to linear chains. However, the invention also comprises, within this term, carbon chains which are branched.

It is also possible to use, alternatively or in combination, one or more non-ionic surfactants/softening agents. These may especially belong to the family of fatty esters, such as those sold by Cognis Corporation under the reference BELLSOFT 7777, previously sold under the reference EMERSOFT 7777 by Henkel Corporation. It may also be glycerol derivatives, such as the monostearic acid of glycerol, like that sold under the references KTAX 668 by Cognis Corporation, previously sold under the reference SONOSTAT 668 by Henkel Corporation. There may also be a paraffinic emulsion, such as that sold under the reference SANDOLUBE NVS-A by Clariant Corporation previously known as Sandoz Chemical Corporation. There may also be a mixture of one or more of these agents with a mineral oil emulsion, such as that sold under the name MULREX.

The invention is particularly appropriate for "light" products having a density of at most 40 kg/m$^3$ but may also apply to heavy products, for example up to 160 kg/m$^3$. The insulation products targeted by the invention are, in particular, those listed in French Standard NFB 20-001 of August 1998. These are especially "felts", namely made of flexible sized mineral wool supplied in the form of "rolls" or "sheets" generally between 20 and 200 mm in thickness. They may also be "stitched blankets" which are based on lightly sized mineral wool covered on one face with a facing, or "panels" which are based on rigid or semi-rigid sized mineral wool. These products all generally have an approximately parallelepipedal shape.

The invention may also apply to products of different geometrical shapes such as "segments", which are plane elements of trapezoidal cross section. They may also be products used for insulating pipes, known as "shells" (annular cylinders made of one or two parts) or as "staves" (parts of a cylinder, the cross section of which is an annular sector). In general, within the context of the invention and in the rest of the present text, and for the sake of brevity, although the term "felt" is used it also encompasses, by extrapolation, the abovementioned similar products.

With regard to those products having an approximately parallelepipedal shape, the situation may therefore be one in which both main faces of the felt are uncovered, with at least one, and preferably both, of them treated according to the invention. The situation may also be one in which one of the main faces is covered with a facing, the other face being treated according to the invention.

As is known, the insulation products of interest in the invention are preferably provided throughout their thickness with a sizing composition whose function is especially to ensure cohesion of the product by creating inter-fibre bonds. The sizing compositions generally contain resins based on phenol, formaldehyde and urea. The inventors became aware that this sizing, although extremely useful, helped to give the surface a slightly rigid and brittle feel.

A first complementary optional means according to the invention, for further improving the feel of the insulation product, therefore consisted in providing the mineral wool with a sizing composition throughout its thickness but with a lower content in that surface region of the product which corresponds to at least part of its uncovered external surface. Highly advantageously, this surface region depleted in sizing composition may coincide with the surface region treated according to the invention with the composition having softening properties: the sizing content of the product is reduced sufficiently moderately that there is no negative impact on its cohesion, and an even more agreeable feel is obtained. This is because there may be a kind of synergy between the main means of the invention, namely the use of the softening composition, and the subsidiary optional means, namely a lower sizing content on the surface: the less-sized surface fibres would be more easily sheathed with the softening composition which would thus be better able to fulfil its function of softening the inter-fibre bonds.

A second complementary optional means for improving the feel of the product (which may be combined with the first) consists in modifying the dimension of the fibres themselves in at least one uncovered surface region, especially that treated with the softening composition. It thus shown that the feel was further improved by having more elongate fibres. One hypothesis for explaining this is that more elongate fibres present overall fewer ends, which are the "catching" points that may be felt when passing one's hand over the product. Modifying the dimensions of the fibres only on the surface allows the mechanical properties of standard insulation products to be maintained.

A third complementary optional means for improving the feel of the products (which may be combined with the first two) consists in modifying the diameter of the fibres themselves in at least one uncovered surface region of the product, especially that treated with the softening composition. It was thus found that the feel was further improved by having attenuated fibres. One hypothesis for explaining this is that attenuated fibres (having a lower micronaire value) are more flexible and therefore more agreeable to the touch. Attenuating the surface fibres may even have a favourable impact on the thermal insulation capacity of the product in its entirety.

The abovementioned first, second and third optional means may affect the product over a surface thickness of a few millimetres to three or four centimeters.

The invention also relates to the product using this first and/or this second and/or this third optional means, independently of any treatment with a composition having softening properties. It also relates to the process for obtaining these characteristics, which process will be explained below and independently of the process for treating the product with the composition having softening properties.

The subject of the invention is also the process for manufacturing the product described above, by internal centrifuging, in which the insulation product is treated with the softening composition on the line for actually producing the mineral wool. A continuous, on-line treatment is clearly advantageous from an industrial standpoint (however, alternatively, the invention does not exclude an off-line treatment on the finished product, possibly requiring a post-treatment step of drying in the open air or using heating means when it is chosen to treat the product with a composition in liquid or non-liquid phase).

According to a preferred method of carrying out the invention, the product is treated with the softening composition downstream of the members for receiving the fibres coming from the fiberizing members, and especially just before the fibres are treated by any thermal conditioning members of the oven type.

As explained in detail in the patents cited in the preamble to the present application, lines for producing glass wool by internal centrifuging generally comprise a plurality of spinners in series. The fibres which are expelled therefrom owing to the effect of the centrifugal force are collected on receiving members of the suction belt type, the fibres coming from each spinner building up in successive layers on the belt which then takes them through an oven and/or shaping rollers. The thermal treatment undergone during passage through the oven makes it possible to dry, crosslink and cure the sizing composition sprayed onto the fibres below the spinners before the fibres have been collected.

It is advantageous to treat the product with the softening composition just before the oven, if there is one, or at the very least once all the fibres have been collected in the form of a web: it is thus possible to carry out the treatment only on the surface of the product, and the heat treatment may allow drying of the liquid phase in which it has been possible to dissolve/disperse the softening composition (if it is in solid or pasty form) or to dilute/disperse it (if it is in liquid form or in the form of a gel), in order to allow it to be applied, for example, by spraying. The liquid phase is preferably an essentially aqueous phase. Instead of a spraying treatment, it is also possible to choose an application method of the coating or dipping type (by moving the product so that it comes into surface contact with a coating roll or by partially immersing it in a bath).

The concentration of the softening composition in its liquid phase is preferably chosen to be between 0.5 and 10% by weight, especially between 2.5 and 5% by weight, with respect to the said liquid phase.

The simplest way in which to apply this composition in liquid phase is to spray it when the insulation product is still in the form of a felt as a continuous web travelling on a means of conveyance of the conveyor belt type (especially just before it enters the oven, as mentioned above). It is then possible to use a spray boom placed above and/or below the plane of conveyance. Advantageously, the spray boom is placed approximately perpendicular to the axis of travel of the felt. If the plane of conveyance is approximately horizontal in the treatment zone, or even slightly inclined, the spray boom placed above the plane of conveyance will treat the upper face of the felt. To treat the lower face, if necessary a break may be provided in the conveyor belt, in a zone where the felt is locally unsupported, so that the boom placed below the plane of conveyance can spray the composition onto its lower face. This is unnecessary if other types of conveyance means are used, in particular those employing chains.

It is also possible to treat the insulation product according to the invention either further upstream or further downstream of the production line:
  further downstream, the softening composition may be sprayed after any thermal conditioning members of the oven type, when the felt is still in the form of a continuous web or when it has already been cut up. The product may be treated once it has passed between the shaping members which give it its final thickness. In this case, it may be necessary to dry the products in order to evaporate the liquid phase, either by leaving them for a certain time in the open air before storing/packaging them, or by drying them using an ad hoc heating means;
  further upstream, it is in fact possible to spray the softening composition in a liquid phase not on a felt already formed but on the fibres just below the fiberizing members, before they are collected on the receiving member. But in this case, in order for the product to still be treated only on the surface, this spraying is carried out only on the fibres coming from the first and/or last fiberizing member in the line ("first" and "last" are to be understood to mean those spinners which will produce the first sheet of fibres to be collected and the last sheet of fibres to be collected on the receiving means of the suction conveyor belt. These sheets correspond in fact to what will form the surface layers of the upper face and the lower face of the felt once it has been formed).

The softening composition may be sprayed using a spray ring of the same type as that used for spraying the sizing composition. The two compositions may be sprayed successively (the sizing composition followed by the softening composition, or vice versa) or simultaneously: it is possible to use a single spray means, by adding the softening composition to the sizing composition. It is also possible to inject the softening composition into the ring for spraying the sizing composition, without prior mixing. Alternatively it is possible to use another spray ring to spray the softening composition.

As mentioned above, a first optional means of the invention consists in using less sizing in the surface regions of the final product. To do this, it is in fact possible to spray a smaller amount of sizing composition onto the fibres coming from the first and/or last fiberizing member as opposed to all the other fiberizing members. The reduction may, for example, be of the order of at least 10 to 20%.

It was also mentioned above that a second and a third optional means of the invention consisted in making sure that the surface fibres in the final insulation product have a different dimension, i.e. attenuated fibres and/or more elongate fibres.

One way of achieving this consists in changing the operating parameters of the "first" and/or of the "last" fiberizing member in the line so as to affect only the surface layers of the final product, as in the previous case. If the conventional construction of this fiberizing member is adopted, it comprises:
  a spinner capable of rotating about an axis, especially a vertical axis, the peripheral band of the spinner being pierced with a plurality of holes;
  a hot-gas extending means in the form of an annular burner;
  a pneumatic fibre-channelling means in the form of a blowing ring.

It is possible to modify, in particular, one fiberizing parameter of the first and/or the last fiberizing member, namely:
  the pressure of the gases emitted by the blowing ring.

A reduction in the pressure of the gases emitted by the blowing ring compared with the other blowing rings in the line is thus possible, especially a reduction of at least 20% and preferably of between 30% and 50% compared with those of the other rings. This is because a lower pressure will tend to break the fibres less and to preserve their length.

In order to attenuate the fibres (reduce their micronaire value), it may be advantageous to modify, either as alternatives or in combination, two other fiberizing parameters of the first and/or of the last fiberizing member:
  the pressure of the annular burner;
  the holes in the spinner.

Thus, it is possible to increase the pressure of the annular burner by, for example, 10 to 25% over and above that of the other burners, thereby increasing the velocity of the extending gases and thus increasing the fineness of the fibres. It is also possible to increase the number of holes in the dish of the spinner, for example by 15 to 25% over and above the number of holes in the other dishes: with the burner pressure kept the same as the others, the same tendency to cause fibre attenuation is observed.

Not having all the fiberizing members in the line operating with the same fiberizing parameters is a very advantageous concept.

The advantage is clear: it is thus possible to confer novel surface properties on the product, to give it a different appearance and to modify its chemistry and/or the geometry of its surface fibres. On the other hand, the conventional fiberizing parameters may be retained for forming the product core, therefore departing little from its well-known overall characteristics. Moreover, the operation of the production line remains completely conventional, industrial implementation of the invention therefore requiring no upheaval.

The subject of the invention is also the apparatus for manufacturing the product described above or for implementing the process described above, in their various alternative forms.

In order to treat the insulating product with the softening composition, the apparatus may include, as already mentioned, one or more spray booms. Preferably, the boom(s) has (have) a feed pipe provided with spray nozzles uniformly distributed over its length. These nozzles are capable of generating jets of liquid which are preferably "flat" (not conical) and divergent. The jets may also be chosen to be conical in shape. The relative configuration between the ramp and the product to be treated may be adjusted so that the jets meet above or on the product, so that the softening composition thoroughly and uniformly impregnates the entire surface of the product.

Figure 2:
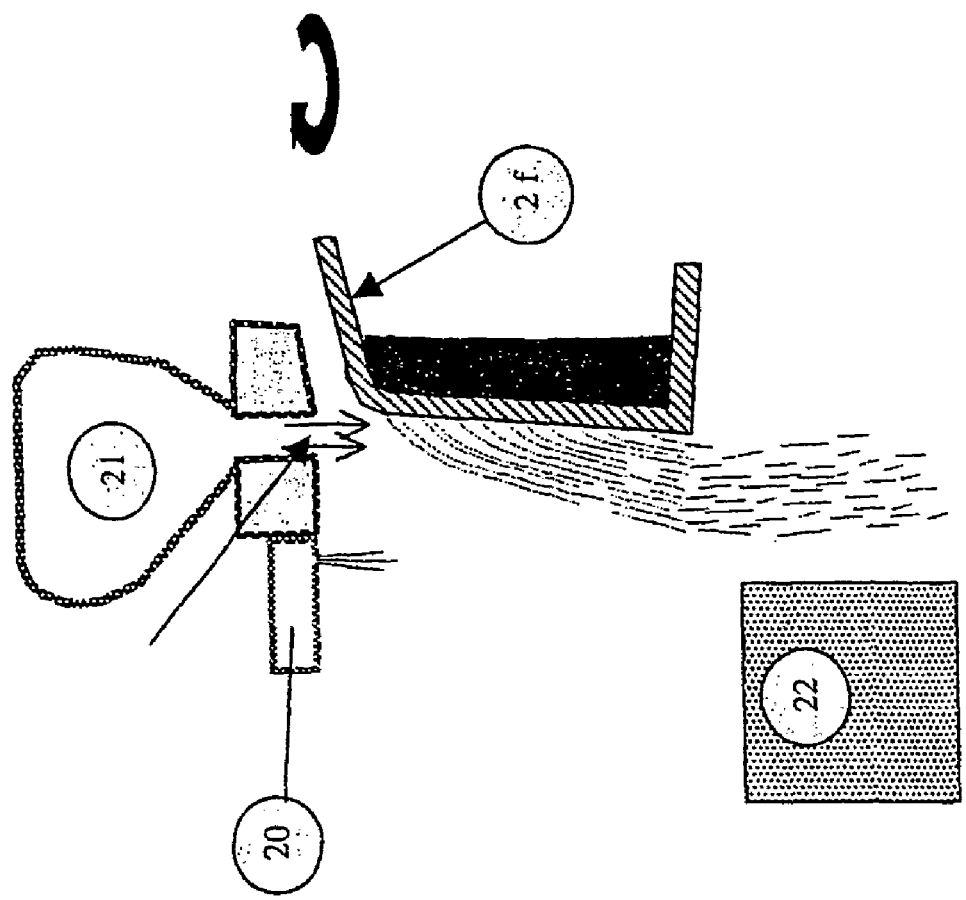
Figure 3:
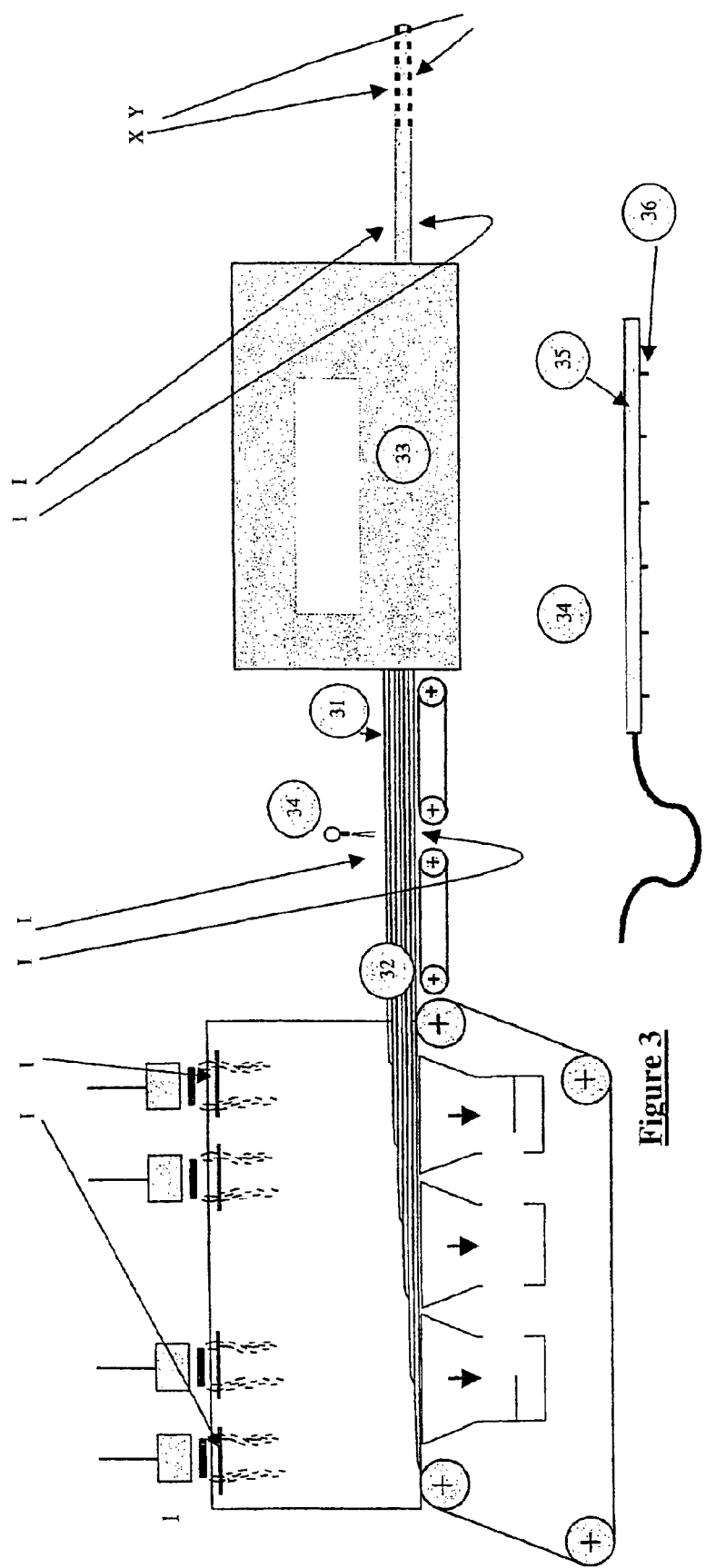

The invention will be described in greater detail below with the aid of the following figures:

FIG. 1: a schematic view of a line for producing glass wool by internal centrifuging;

FIG. 2: a schematic view of a spinner of the said line;

FIG. 3: a schematic view of that zone of the production line where the product is treated with the softening composition.

The figures are intentionally highly schematic and are not shown to scale in order to make them easier to examine.

The non-limiting illustrative embodiments which follow all relate to the manufacture of glass wool felts having a density of approximately 8 to 12 kg/m³ and dimensions of 60 mm×80 mm×120 mm, which are manufactured on a production line of the type illustrated highly schematically in FIG. 1. In some cases, these felts are provided on one of their faces with a facing of the kraft paper type (for example) and are treated in accordance with the invention on their other face, in order to improve the latter's feel.

Referring to FIG. 1, this therefore shows a line 1 comprising six spinners 2a, 2b, 2c, 2d, 2e, 2f in series, from which fibres 3 are expelled in the form of a torus (production lines generally have between three and eight spinners). The fibres are sized using spray rings 8 and then collected on a suction conveyor belt 4, which transports them in the form of a continuous web 5 as far as an oven 6 which is provided with shaping rollers and which cures the size on the fibres and gives the felt 7 the desired dimensions and thickness. After leaving the oven, the continuous web of felt will then be cut up into approximately parallelepipedal panels and then packaged as rolls or packaged as folded or as unfolded sheets (the end of the line has not been shown).

In accordance with the invention, and as shown in greater detail in FIG. 3, this conventional production line has added to it a step of spraying a softening composition 30 in aqueous phase onto the upper face 31 of the felt 32 still in the form of a continuous web and not yet shaped, just upstream of the crosslinking oven 33.

This operation is carried out using a spray boom 34 supplied with a suitable solution and having a pipe 35 along which nozzles 36 are uniformly placed (the boom is illustrated enlarged, seen from the front, at the bottom of the figure for the sake of clarity). These nozzles generate flat divergent jets which interpenetrate shortly before coming into contact with the upper surface 31 of the felt 32. The amount of liquid thus sprayed and the pressure at which it is sprayed are adjusted so that the solution impregnates the product to a few millimetres, especially 1 or 2 mm. This boom is placed above the conveyed felt in an approximately horizontal plane, at a distance of approximately 50 to 80 cm from the surface 31 of the felt, and transversely to its axis of travel, using a gantry (not shown).

In FIG. 3, arrows i indicate all the zones of the line where it is possible, as alternatives or in combination, to apply the softening composition. The arrows X and Y show the surfaces of the insulating product which may be treated according to the invention.

The softening solution A which is sprayed has the following composition:

aqueous phase
cationic surfactant at 0.025%, 0.05% and 0.1% by weight with respect to the aqueous phase, consisting of a surfactant comprising 90% of a fatty acid acetate salt and 10% of acetic acid. This product is in the form of water-dispersible flakes.

The acetate has the following chemical formula:

N-[2[[2-[[2-[(2-aminoethyl)amino]-ethyl]amino]-
ethyl]aminoethyl]-octadecanamide, monoacetate
(9Cl) of molecular formula $C_{26}H_{57}N_5O.C_2H_4O_2$.

EXAMPLE 1

The fiberizing parameters are conventional. All the spinners operate with the same parameters and a standard sizing composition based on a phenolformaldehyde resin is sprayed under each spinner in a known manner using a spray ring.

Tests were carried out in which the softening solution A was sprayed so that the surfactant content on the surface of the product was 0.2 g/m² of treated surface.

Comparisons with panels that were in every way identical but were not treated with the solution A were then carried out on the final panels obtained.

Evaluating the feel of a product is not completely objective insofar as it requires individual judgement. The test chosen consisted in asking ten different individuals to compare five products in pairs, these individuals having to give a rating of 0 or of 1 after having touched the uncovered face of the panels, the 0 rating corresponding to a product regarded as being less agreeable than that with a rating of 1. Then, after compilation and statistical calculation, these five products may be arranged in an increasing or decreasing order of softness to the touch. It turned out that the products according to the invention were all identified as being significantly more agreeable to touch than the untreated control products (although the evaluation test was carried out "blind" by mixing the treated and untreated products).

Moreover, it was confirmed that this surface impregnation does not affect the mechanical properties of the products according to the invention. The thickness recovery after compression and the tensile strength are virtually unchanged compared with the control products.

EXAMPLE 2

Not only were the products treated as in Example 1, but in addition one fiberizing parameter was changed in the case of only the last fiberizing member in the production line, namely the spinner 2f in FIG. 1.

Referring to FIG. 2, which shows the spinner 2f in detail, the modified parameter is the pressure of the blowing ring 20, which is decreased to a value of approximately 0.7 bar, while the blowing rings of the other spinners are maintained at a gas-emission pressure of approximately 1.2 bar.

The operation of such a spinner, already described in the aforementioned patents, will not be described in detail here. It will be recalled that it is surrounded by an annular burner 21 emitting a high-velocity jet of hot gas. The sizing ring placed well below the spinner is not shown either. Optionally, a device for heating the lower part of the spinner itself, in the form of a magnetic induction ring 22, is used. It is preferable to carefully control the reduction in pressure of the gases emitted by the blowing ring, since too great a reduction would incur the risk of enlarging the torus of the fibres expelled from the spinner in such a way that the fibres could come into contact with the inductor 22, something which is, of course, to be avoided.

The panels obtained according to this illustrative example according to the invention were judged to have an even more agreeable feel than the panels according to illustrative example 1, this probably being due to the fact that the fibres produced by the spinner 2f, fibres which in the felt will form its upper surface layer, are more elongate than the fibres in the rest of the felt.

As in the case of illustrative example 1, this additional surface modification did not result in a significant reduction in the mechanical properties of the final product. It affected only the layer of mineral wool produced by one spinner, i.e. approximately one sixth of the final thickness of the product (variants may consist in treating the product over a greater or lesser thickness compared with the total thickness of the product, for example between one third and one tenth of the total thickness).

EXAMPLE 3

This illustrative example adds to illustrative example 1 the fact that the amount of sizing sprayed onto the fibres coming from the spinner 2f is modified; approximately 20% (by weight) less sizing is sprayed onto these fibres.

Here again, it was found that the felts obtained are a little softer than those obtained according to Example 1 without, however, any appreciable negative impact on the mechanical properties of the product or on its cohesion. This time, the upper face of the products was therefore doubly modified from the chemical standpoint, by the addition of a surfactant and by a smaller amount of sizing.

The above examples relate to one type of glass wool production line, but the invention is not limited to it. It may also be applied in the same way to glass wool felts manufactured on a line in which the spinners are grouped in modules with, for each module, a system for receiving the fibres leaving the spinners using rollers. A detailed description of this type of line will be found in patent EP-B-0,406,107: corresponding to each "module" is the formation of a "primitive", and all the primitives are gathered together before being taken in the form of a single felt into the oven. It also applies to rock wool or basalt wool, and to any type of fibre provided with a binder, or to glass yarns for reinforcement.

In conclusion, the invention has allowed the discovery of various means that may be combined to obtain uncovered felts which are softer to touch. Many variants fall within the scope of this invention. Thus, it is possible to add to the softening composition other surfactants, additives having another function (a colorant for aesthetic purposes, water-repellent agents, coupling agents, etc.). The treated surface may also be rendered more hydrophobic. It is also conceivable to treat the felts with several compositions having different functions, for example in succession.

The invention may be widened to any surface treatment of insulation felts with chemicals aiming to modify their appearance or their surface properties. It also encompasses the treatment of rock wool felts manufactured by means of other techniques of the external centrifuging type, using centrifuging rollers.

The invention claimed is:

1. A thermal and/or acoustic insulation product, comprising:
a mineral wool having an at least partially uncovered external surface; and
a surface-treatment provided on at least a portion of the external surface;
wherein:
the surface-treatment comprises a composition having softening properties;
the composition comprises at least one surfactant;
the composition is present on the uncovered surface in an amount of at least $0.1$ g/m$^2$ and at most 5 g/m$^2$; and
the composition is present in the mineral wool to a thickness of at most 10 mm.

2. Insulation product according to claim 1, wherein the composition is applied to the mineral wool in the form of a liquid, a paste, a gel, or a solid.

3. Insulation product according to claim 1, wherein the composition having softening properties comprises at least one cationic surfactant carrying at least one localized or delocalized positive charge.

4. Insulation product according to claim 1, wherein the composition having softening properties comprises at least one non-ionic surfactant/softening agent.

5. Insulation product according to claim 3, wherein the cationic surfactant comprises one or more chains based on fatty acids or on a fatty acid derivative, and at least one nitrogen-containing group capable of carrying a localized or delocalized positive charge.

6. Insulation product according to claim 1, wherein the insulation product is in the form of a felt of approximately parallelepipedal shape, with both main faces uncovered, at least one of which is treated with the composition having softening properties, or with one uncovered main face treated with the composition having softening properties and the other main face covered with a facing.

7. Insulation product according to claim 1, wherein the insulation product is in the form of a shell, a stave or a segment.

8. Insulation product according to claim 1, wherein a density of the insulation product is less than or equal to 40 kg/m$^3$ or greater than 40 kg/m$^3$ up to 160 kg/m$^3$.

9. Insulation product according to claim 1, wherein the mineral wool is provided with a sizing composition through a thickness thereof.

10. Insulation product according to claim 1, wherein the mineral wool has, in a surface region corresponding to at least part of its uncovered external surface, fibers of different dimensions.

11. A process for manufacturing the insulation product according to claim 1, by internal centrifuging, wherein said product is treated with the composition having softening properties on a mineral wool production line.

12. Process according to claim 11, wherein the insulation product is treated with the composition having softening properties downstream of members for receiving fibers coming from fiberizing members.

13. Process according to claim 12, wherein the insulation product is treated with the composition having softening properties in a liquid phase by spraying, coating or dipping.

14. Process according to claim 13, wherein a concentration of the composition having softening properties in the liquid phase is from 0.5 to 10% by weight.

15. Process according to claim 11, wherein the insulation product still in the form of a continuous felt, traveling on a conveyor belt, is treated using at least one spray boom placed above and/or below the plane of conveyance.

16. Process according to claim 11, wherein the product is treated with the composition having softening properties on a production line, comprising a plurality of fiberizing members in series, by spraying, onto fibers coming only from a first and/or a last fiberizing member, before said fibers being received on a receiving member corresponding to the first and/or last fiberizing member.

17. Process according to claim 16, wherein the composition having softening properties is sprayed by means of a spray ring used to spray a sizing composition or by means of another spray ring.

18. Process according to claim 11, wherein a production line comprising several fiberizing members in series is used, each fiberizing member comprising:
a spinner capable of rotating about an axis, a peripheral band of the spinner being pierced with a plurality of holes;
a hot-gas extending means in the form of an annular burner; and
a pneumatic means for channeling/adjusting a fiber dimension in the form of a blowing ring, wherein a pressure of gases emitted by the blowing ring of a first and/or of a second fiberizing member is less than that of other fiberizing members by at least 20% so that the insulation product has longer fibres on the surface over at least part of the external uncovered surface.

19. Process according to claim 11, wherein a production line comprising several fiberizing members in series is used, each fiberizing member comprising:
a spinner capable of rotating about an axis, a peripheral band of the spinner being pierced with a plurality of holes;
a hot-gas extending means in the form of an annular burner; and
pneumatic means for channeling/adjusting a fiber geometry in the form of a blowing ring wherein a pressure of gases emitted by the annular burner of a first and/or of a last fiberizing member is greater than that of burners of other fiberizing members by approximately 10 to 25%, and/or a number of holes in the spinner of the first and/or of the last fiberizing member is greater than that in the other spinners by 15 to 25% so that the insulation product has, on the surface, over at least part of the external uncovered surface, fibers of smaller diameter or lower micronaire value.

20. Process according to claim 11, wherein a production line comprising a plurality of fiberizing members in series is used, in which a sizing composition is sprayed onto the fibres coming from the plurality of fiberizing members before the fibers reach a receiving member, and 10 to 20% less sizing composition is sprayed onto the fibres coming from the first and/or the last fiberizing member of the plurality so that the insulation product has over at least part of the external uncovered surface a smaller sizing content than through a thickness of the insulation product.

21. Insulation product according to claim 1, wherein the thermal/acoustic insulation is pleasant to lay.

22. Insulation product according to claim 1, wherein the thickness is at most 5 mm.

23. Insulation product according to claim 4, wherein the non-ionic surfactant/softening agent belongs to a family of fatty esters or is a glycerol derivative, the glycerol derivative being selected from the group consisting of a glycerol monostearic acid and paraffinic emulsions and being optionally combined with a mineral oil emulsion.

24. Insulation product according to claim 5, wherein the at least one nitrogen containing group is selected from the group consisting of quaternary ammonium salts, imidazolinium salts, amine oxide derivatives, and amidoamine acetates.

25. Insulation product according to claim 9, wherein a content of the sizing composition is lower in a surface region corresponding to at least part of the uncovered external surface corresponding to the region treated with the composition having softening properties.

26. Insulation product according to claim 10, wherein the surface region corresponds to the region treated with the composition having softening properties and the fibers of different dimensions in the surface region have a greater length and/or a smaller diameter or lower micronaire value than in the rest of a thickness of the product.

27. Process according to claim 12, wherein the insulation product is treated with the composition having softening properties upstream of any heat treatment/conditioning ovens.

28. Process according to claim 14, wherein the concentration of the composition is from 2.5 and 5% by weight.

29. Process according to claim 15, wherein the at least one spray boom is placed approximately perpendicular to an axis of travel of the conveyor belt.

30. Process according to claim 16, wherein the composition is sprayed before, during or after a deposition of a sizing composition onto the product.

31. Process according to claim 18, wherein the pressure of the gases is between 30 and 50%.

* * * * *